United States Patent [19]

Kumano et al.

[11] Patent Number: 4,964,044
[45] Date of Patent: Oct. 16, 1990

[54] MACHINE TRANSLATION SYSTEM INCLUDING SEMANTIC INFORMATION INDICATIVE OF PLURAL AND SINGULAR TERMS

[75] Inventors: Akira Kumano, Kamakura; Yumiko Sugiura, Yokohama; Chiaki Aoyama, Tokyo, all of Japan

[73] Assignee: Kabushiki Kaisha Toshiba, Kawasaki, Japan

[21] Appl. No.: 412,538

[22] Filed: Sep. 22, 1989

Related U.S. Application Data

[63] Continuation of Ser. No. 43,963, Apr. 29, 1987, abandoned.

[30] Foreign Application Priority Data

May 20, 1986 [JP] Japan ................. 61-113716

[51] Int. Cl.$^5$ ............................. G06F 15/38
[52] U.S. Cl. ..................... 364/419; 364/900
[58] Field of Search .................. 364/419, 900

[56] References Cited

U.S. PATENT DOCUMENTS

| | | | |
|---|---|---|---|
| 4,420,816 | 12/1983 | Yoshida | 364/900 |
| 4,439,836 | 3/1984 | Yoshida | 364/419 |
| 4,594,686 | 6/1986 | Yoshida | 364/900 |
| 4,633,435 | 12/1986 | Morimoto | 364/900 |
| 4,641,264 | 2/1987 | Nitta et al. | 364/900 |
| 4,703,425 | 10/1987 | Muraki | 364/419 |

OTHER PUBLICATIONS

"Research on Translation System of Japanese-English Scientific/Technical Documents", Report on Development of Language Processing System; ETL, Kyoto University, Mar. 1985, p. 493.

*Primary Examiner*—Michael R. Fleming
*Assistant Examiner*—Gail O. Hayes
*Attorney, Agent, or Firm*—Foley & Lardner, Schwartz, Jeffery, Schwaab, Mack, Blumenthal & Evans

[57] ABSTRACT

To translate Japanese having no morphological distinction between singular and plural forms into English having a morphological distinction between the two, for instance, the dictionary unit includes semantic information indicative of the plural number, and the translation unit syntactically and semantically translates Japanese into English as follows: a Japanese sentence is morphologically analyzed into basic morphemes by an inflection information dictionary; lexical syntactic information of the Japanese basic morphemes are retrieved form a word/phrase dictionary; the Japanese sentence is syntactically analyzed into an intermediate structure by Japanese syntactic analysis grammar to clarify modification relationship between two words; the Japanese intermediate structure is semantically transferred into an English intermediate structure by structure transfer grammar; a concept data of a noun (e.g. "book") which includes FEATURE:NUMBER=PLURAL is formed when the noun is modified by an adjective (e.g. "many") indicative of the plural number; an English sentence structure is syntactically generated from the intermediate structure and by English syntactic generation grammar; and lastly an English morphemes are generated by morphological generation grammar to change "book" into "books".

8 Claims, 7 Drawing Sheets

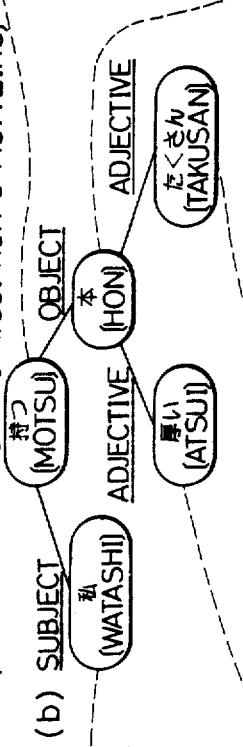

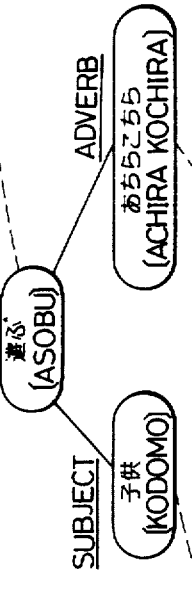

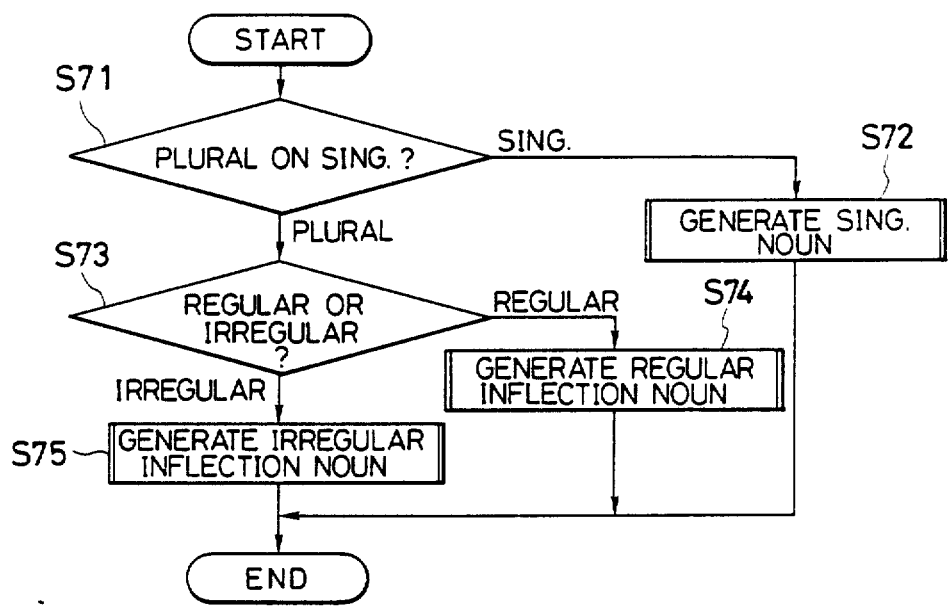

MACHINE TRANSLATION SYSTEM INCLUDING SEMANTIC INFORMATION INDICATIVE OF PLURAL AND SINGULAR TERMS

This application is a continuation of application Ser. No. 07/043,963, filed Apr. 29, 1987, now abandoned.

BACKGROUND OF THE INVENTION

1. Field of the Invention

The present invention relates to a machine translation system for translating a first language into a second language, and more specifically to the system for translating a first language having no morphological distinction between singular form and plural form into a second language having morphological distinctions between the two.

2. Description of the Prior Art

Recently, machine translation systems for automatically translating an input one language sentence into another language sentence by means of a computer have been highlighted. In these machine translation systems, basically an input original sentence is divided into predetermined morphemes (translation units) such as word or phrase by means of morphological analysis grammar (rules for word formation); lexical syntactic information and an appropriate word or phase for translation are determined for each morpheme by retrieving a translation dictionary; the input sentence is syntactically analyzed into an intermediate structure by first-language syntactic analysis grammar to build an intermediate structure; the first-language intermediate structure is transferred into a second-language intermediate structure by structure transfer grammar; and those retrieved translation candidate words are combined by means of second-language syntactic generation grammar in order to generate a second-language sentence.

In these translation processes, where English is translated into German or vice versa, for instance, since these two languages are both formed with singular and plural nouns, features indicative of difference in morpheme between singular and plural nouns of the first language can be applied as they are in determining the singular or plural form of nouns of the second language. However, where Japanese is translated into English, for instance, since the Japanese language has no features indicative of difference in morpheme between the singular and plural nouns, it is necessary to determine whether nouns in the original Japanese sentence should be translated into singular nouns or plural nouns. In addition, where Japanese is translated into German, for instance, since German is formed with various features indicative of difference in adjective, definite article, indefinite article, etc. between singular form and plural form, it is further important to determine whether nouns in the original Japanese sentence are singular or plural.

In other words, in the prior-art translation systems, there exists a problem in that it is impossible to accurately translate a first original language including categories with no difference between singular and plural forms into a second translation language including categories with differences between the two.

SUMMARY OF THE INVENTION

With these problems in mind, therefore, it is the primary object of the present invention to provide a machine translation system which can translate a first language sentence having no singular and plural morphemes into a second language sentence including appropriate singular and plural morphemes.

To achieve the above-mentioned object, the machine translation system according to the present invention for translating a first language having no morphological distinction between singular form and plural form into a second language having a morphological distinction between the two, having: (a) input means for inputting an original sentence in the first language; (b) dictionary means for storing various information about the first language and between the first and second languages; (c) translation means for translating an original sentence in the first language into a translated sentence in the second language on the basis of information stored in said dictionary means; and (d) output means for outputting the translated sentence in the second language, characterized in that (1) said dictionary means comprises semantic information indicative of plural number; and (2) said translation means syntactically and semantically translates the first language into the second language on the basis of syntactical modification relationship between a first category having a morphological distinction between singular and plural forms and a second category including semantic information indicative of the plural number.

The translation means translates the first language having no morphological distinction between singular form and plural form into the second language having a morphological distinction between the two in accordance with the following procedure: (a) morphologically analyzing the first language sentence into first-language basic morphemes on the basis of an inflection information dictionary; (b) retrieving lexical syntactic information of the analyzed first-language basic morphemes from a word and phase dictionary; (c) syntactically analyzing the first language sentence into an intermediate structure representative of modification relationship between at least two words in accordance with first-language syntactic analysis grammar; (d) semantically transferring the first-language intermediate structure into a second-language intermediate structure in accordance with structure transfer grammar, and forming a concept data of a first category including a feature indicative of the plural number when the first category is modified by the second category including a semantic nature indicative of the plural number; (e) syntactically generating a second-language sentence structure from the second-language intermediate structure and in accordance with second-language syntactic generation grammar; and (f) generating morphemes in the generated second-language sentence structure in accordance with morpholopical generation grammar.

The first category is a noun, pronoun, adjective, definite article, an indefinite article, etc., while the second category is an adjective, adjective phrase, adverb, adverb phrase, etc.

In the machine translation system according to the present invention, in spite of the fact that the first language to be translated has no morphological distinction between the singular and plural forms, it is possible to generate an accurate second language having appropriate morphological distinction between the two, thus eliminating troublesome edition and revise operations in machine translation.

BRIEF DESCRIPTION OF THE DRAWINGS

The features and advantages of the machine translation system according to the present invention over the prior-art system will be more clearly appreciated from the following description of the preferred embodiment of the invention taken in conjunction with the accompanying drawings in which:

FIG. 6A is an illustration for assistance in explaining various data used for translating an example of Japanese sentence (a) into English sentence (d), where (b) denotes an intermediate sentence structure and (c) denotes a concept data, in which an adjective indicates that a noun is plural;

FIG. 6B is another illustration for assistance in explaining various data used for translating another example of Japanese sentence (a) into English sentence (d), in which an adverb phrase indicates that a noun is plural;

FIG. 7 is a flowchart showing the control procedure executed by the translation unit for determining each morpheme, and FIG. 8 is an example of dictionary including nouns of irregular inflection information.

DETAILED DESCRIPTION OF THE PREFERRED EMBODIMENTS

An embodiment of the machine translation system according to the present invention will be described hereinbelow with reference to the attached drawings.

Figure 1:
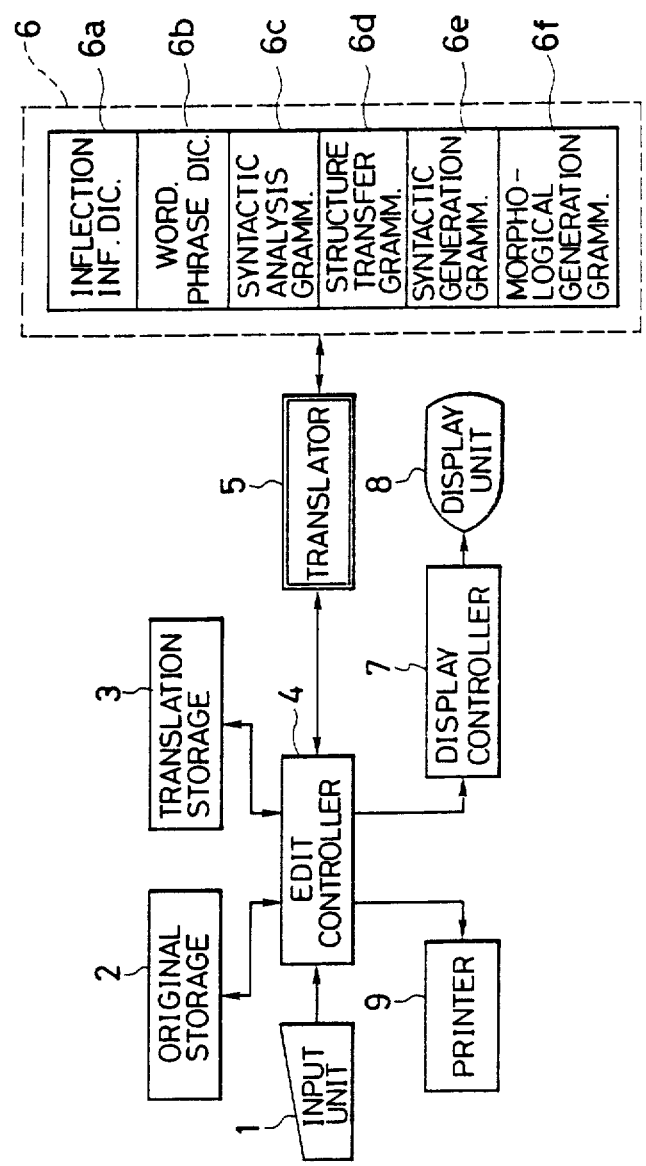
FIG. 1 is a schematic block diagram of an embodiment of the machine translation system according to the present invention.

FIG. 1 is a schematic block diagram of the entire system. The system is made up of an input unit 1 having a keyboard, an original sentence storage unit 2 for storing original first-language sentences inputted through the keyboard, a translated sentence storage unit 3 for storing translated second-language sentences corresponding to the stored original sentences; an edition control unit 4 for controlling the entire system; a translation processing unit 5 for executing translation; a translation dictionary unit 6 for accommodating various information utilized for translation processings, a display control unit 7 for controlling the display unit; a display unit 8 for displaying original sentences, translated sentences, etc., and a printer unit 9 for outputting original sentences and translated sentences as hard copy. The translation dictionary unit 6 includes an inflection information dictionary 6a for morphologically analyzing the first language into basic morphemes, a word and phrase dictionary 6b for retrieving lexical information of the analyzed first-language basic morphemes, a first-language syntactic analysis grammar 6c for syntactically analyzing the first language sentence into an intermediate structure indicative of modification relationship between words, a structure transfer grammar 6d for transferring a first-language intermediate structure into a second-language intermediate structure, a second-language syntactic generation grammar 6e for syntactically generating the second language from the second-language intermediate structure, and a morphotogical generation grammar 6f for generating morphemes in the second-language sentence in dependence upon the analyzed modification relationship between words.

Figure 2:
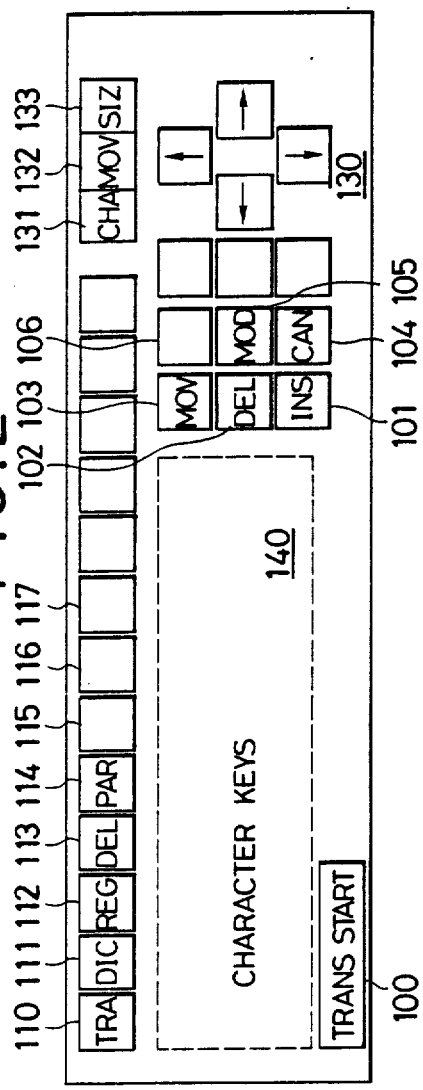
FIG. 2 is an illustration showing an arrangement of keys of an input unit incorporated in the system shown in FIG. 1.

FIG. 2 shows an exemplary key arrangement of the input unit 1. The key arrangement can roughly be divided into translation key 100, character keys 140, function keys 110 to 117, edition keys 101 to 106, cursor keys 130 to 133, etc.

The translation key is used for starting translation.

The function keys are a translated word display key 110 for displaying a basic word for translation corresponding to a word included in the original sentence, a dictionary display key 111 for displaying the contents of the dictionary corresponding to a word included in the original sentence, a dictionary registration key 112 for registering new words or phrases, a dictionary delete key 113 for deleting registered words or phrases, a partial translation key 114 for display partial translation when translation fails, etc.

The edition keys are an insert key 101 for inserting a character or characters before a cursor position, a delete key 102 for deleting a character or characters indicated by the cursor, a move key 103 for moving a part designated by cursor to another position, a cancel key 104 for disabling the edition keys 101, 102 and 103, and a modify key 105 for displaying another candidate word modified by a word or phrase designated by the cursor in accordance with auxiliary information.

The cursor keys are four cursor move keys 130 for moving a cursor in any desired direction, a unit change key 131 for changing-over cursor movement units, an area move key 132 for moving a cursor between an original display area and a translation display area, a cursor size key 133 for expanding or compressing the size of a cursor to a character unit or a word unit, etc.

Figure 3:
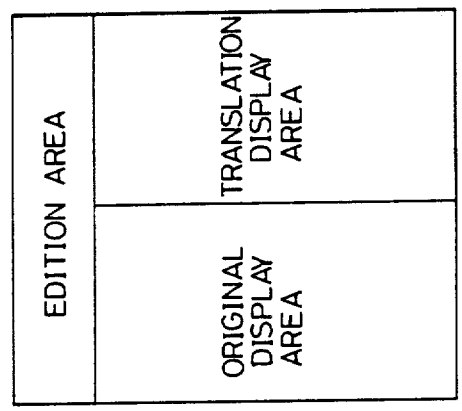
FIG. 3 is an illustration showing display areas on a picture of a display unit incorporated in the system shown in FIG. 1.

FIG. 3 shows an exemplary layout on a picture of the display unit 8, in which the picture is divided into three, edition area, original (1st language) display area, and translation (2nd language) display area. Various information necessary for edition is displayed in the upper edition area; an original sentence is displayed in the left original area; and a translated sentence is displayed in the right translation area in line with the original sentence so as to correspond to each other.

Figure 4:
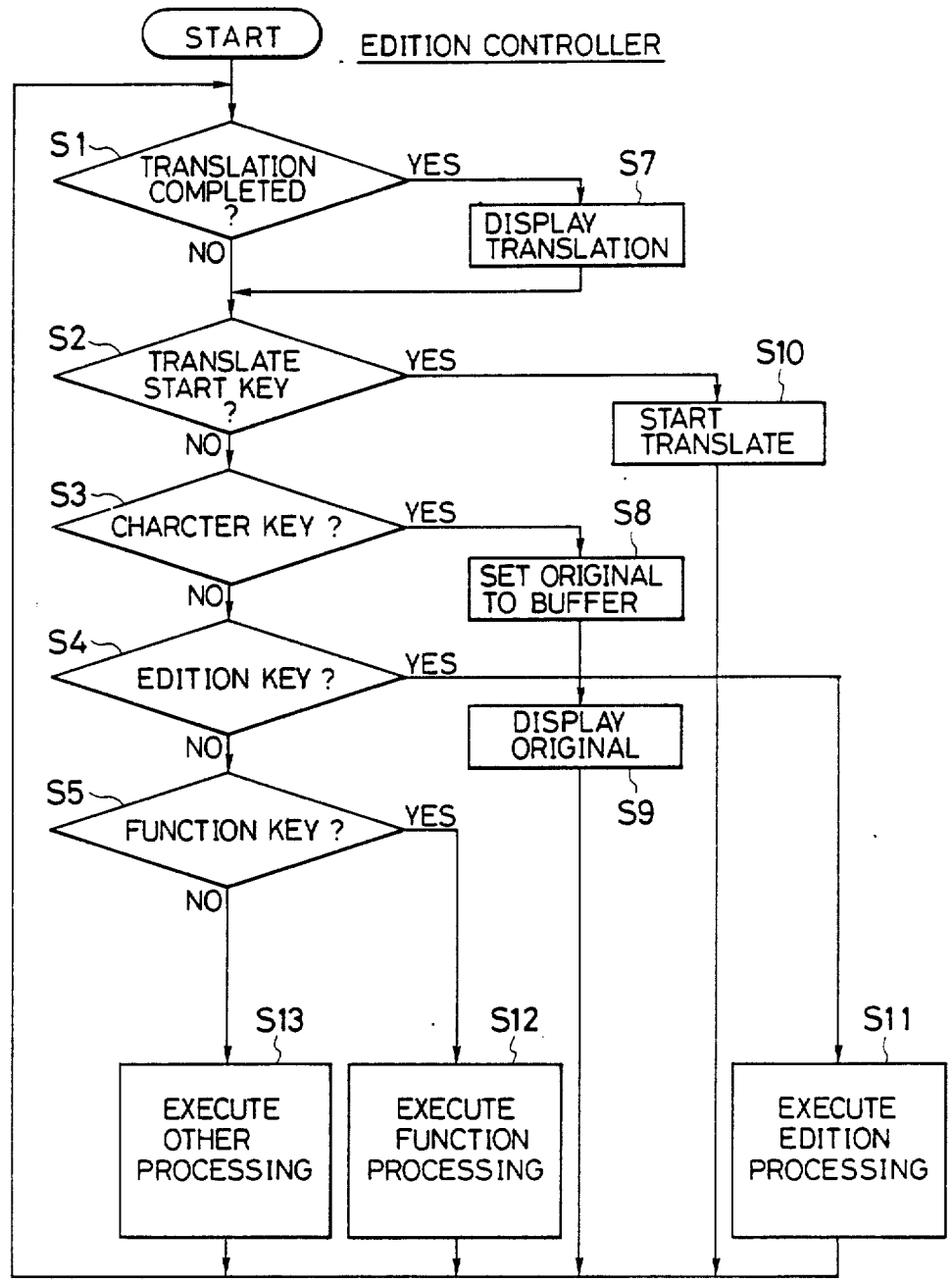
FIG. 4 is a flowchart showing the control procedure executed by an edition control unit incorporated in the system shown in FIG. 1.

With reference to the flowchart shown in FIG. 4, conversational translation procedure will be described. Here, the conversational translation implies that an input original sentence is translated into a translated sentence so as to correspond to each other in accordance with operator's editing operations.

The edition control unit 4 always monitors translation status (in step S1) and depressions of a translate start key (in step S2), character keys (in step S3), edition keys (in step S4), and function keys (in step S5). When the edition control unit receives a signal for one translation completion, a translated sentence is displayed (in step S7); when the translate start key is depressed, translation starts (in step S10); when character keys are depressed, an original sentence is set to an input buffer (in step S8) and then displayed (in step S9); when an edition key is depressed, an edition processing is executed (in step S11); when a function key is depressed, a function processing is executed (in step S12); and when another key other than the above-mentioned keys is depressed, another processing is executed (in step S13), for instance such as cursor key movement. The above-mentioned processings are all executed under control of the edition control unit 4.

Further, when one translation is completed, translation candidates (described later) are displayed (in step S7) in line with the original sentence or at position corresponding to the original sentence, and some auxiliary information is displayed at higher luminance or in reversal illumination display manner. In these conditions, when an edition key is depressed, an addition processing corresponding each edition key is effected for a word or phrase designated by the cursor (in step S11).

Therefore, when an operator inputs an original sentence by depressing character keys, character codes corresponding to the depressed keys are set in an input buffer (in step S8), and then displayed on the original display area of the display unit 8 via the display control unit 7. When the operator depresses the translation start key 100 after having inputted an original sentence, the edition control unit 4 transfers the original sentence stored in the input buffer to the translation unit 5 and instructs the start of translation processing (in step S10). During the original sentence inputting operation, various edition operations such as correction, insertion, deletion, etc. can be effected, where necessary, by moving cursor to any given editing positions before depressing one of the edition keys.

With reference to the flowchart shown in FIG. 5, the translation processing in the translation unit 5 will be described. An inputted original (e.g. Japanese) sentence is divided into some Japanese morphemes each having an inflection (translation unit) and then each divided morpheme is transferred into each basic morpheme on the basis of the inflection information dictionary 6a in step S51 (morphological analysis). Various information (e.g. a category, a translation, etc.) of each of the divided and transferred basic morphemes is retrieved from the word and phrase dictionary 6b in step S52 (dictionary retrieval) to obtain translation (e.g. English) candidates. The retrieved lexical syntactic information is supplied to the succeeding step in step S53 (the analysis control unit provided in the translation unit 5) (for analysis control).

The Japanese sentence is analyzed syntactically in accordance with Japanese syntactic analysis grammar 6c in step S54 (syntactic analysis). That is, Japanese intermediate structure is built. In case the syntactic analysis fails, control returns to step S53 to repeat the syntactic analysis in step S54. The Japanese intermediate structure arranged in accordance with Japanese sentence structure are transferred into an English sentence structure in accordance with a transfer grammar 6e in step S55 (semantic analysis) to obtain an English intermediate structure. When the transferred English intermediate structure is abandoned by the operator, control returns to the step S54 (syntactic analysis). The English words or phrases are arranged in the ordinary order in accordance English syntactic generation grammar 6e in step S56 (syntactic generation). Inflection of words are determined in accordance with English morphological generation grammar 6f in step S57 (morphological generation) to complete a translated sentence. The above translation processings are executed under control of the edition control unit 4 and the translation control unit 5.

In the above-mentioned translation method, the gist of the present invention is to prepare a word and phrase dictionary including an item "NATURE" in which a semantic (e.g. the singular number, the plural number, etc.) of a modifier (modifying word) is written. In other words, the dictionary includes information indicative of "plural". Therefore, when the sentence is analyzed syntactically so that the relationship between a noun and a modifier is clarified, it is possible to determine the noun is plural on the basis of the semantic of the modifier. Once a noun is determined as plural, a concept data of the modified noun is formed, in which "NUMBER=PLURAL" is written in a slot "FEATURE" of the concept data. The above-mentioned gist of the present invention is to effect syntactic (sentence structure) and semantic (word meaning) analyses separately.

FIG. 6A shows an example where a noun is determined to be plural on the basis of an adjective indicative of the plural number.

Assume that a Japanese sentence as shown in FIG. 6A-(a) is inputted. The structure of this Japanese sentence is analyzed through steps S51 to S54 (FIG. 5) to obtain an intermediate sentence structure as shown in FIG. 6A-(b). Here, each relationship between at least two words is analyzed grammatically and syntactically, and additionally each word is linked with each concept data retrieved in the dictionary retrieval step.

In the succeeding step S55, the Japanese sentence structure is transferred to an English sentence structure. In this step S55, being different from the prior art step, a semantic analysis is effected. That is, the concept data for "TAKUSAN (=many)" (which is retrieved from the word and phrase dictionary) includes a semantic information such as "NATURE=NUMBER : PLURAL"; the concept data for "HON (=book)" includes morphological information such as "COUNTABLE/UNCOUNTABLE=COUNTABLE" and "PLURAL=REGULAR RULE (+s)".

Since this "TAKUSAN (=many)" has already been analyzed as an adjective modifying the noun "HON (=book)", "NUMBER =PLURAL" is added to the concept data for "HON (=book)" as the feature of this noun, as depicted in FIG. 6A-(c). In other words, the noun "HON (=book)" is determined as plural on the basis of the adjective "TAKUSAN (=many)" which modifies this noun. In the succeeding step S56, the order of the retrieved English words is determined in accordance with the English syntactic generation grammar as follows:

"(I)—(have)—(many)—(thick)—(book)—(.)"

Finally, in step S57, a final English sentence is generated on the basis of the concept data for all the words. Here, since a feature "NUMBER =PLURAL" is given to the concept data for "HON (=book)", "books" can be determined in accordance with "PLURAL=REGULAR RULE (+s)" included in the concept data of "HON (=book)" as depicted in FIG. 6A-(d).

In summary, "book" is determined as plural on the basis of an adjective "many" which modifies "book" by forming a concept data for "book" which includes a feature of "NUMBER =PLURAL". Further, in the above example, since the adjective "thick" which also modifies "book" has a nature of "SIZE", no feature is described in the concept data for "thick" without relation to the number of the noun "book".

FIG. 6B shows another example where a noun is determined to be plural via a verb on the basis of an adverb phrase indicative of the plural number.

A Japanese sentence as shown in FIG. 6B-(a) is analyzed into an intermediate sentence structure as shown in FIG. 6B-(b). Since the concept data for "ACHIRA KOCHIRA (=here and there)" includes semantic information such as "NATURE =NUMBER : PLURAL" and modifies the verb "ASOBU (=play)", the subject noun "KODOMO (=child)" is determined as plural via the verb. Further, since the concept data for "KODOMO (=child)" includes morphological information such as "COUNTABLE/UNCOUNTABLE=COUNTABLE" and "PLURAL=IRREGULAR" and further the "ACHIRAKOCHIRA (=here and there) has already been analyzed as an adverb phrase modifying the verb "ASOBU (=play)", "NUMBER=PLURAL" is written in the concept data for "KODOMO (=child)" (the subject of the verb) as the feature of this noun, as depicted in FIG. 6B-(c). In other words, the noun "KODOMO (=child)" is determined as plural on the basis of the adverb phrase "ACHIRAKOCHIRA (=here and there)" which modifies the noun via the verb "ASOBU (=play)". The order of the retrieved English words is determined as follows:

"(child)→(play)→(here and there)→(.)"

A final English sentence is generated on the basis of the concept data for all the words. Here, since a feature "NUMBER =PLURAL" is given to the concept data for "KODOMO (=child)", "children" can be determined on the basis of an irregular inflection table (described later), as depicted in FIG. 6B-(d).

Figure 5:
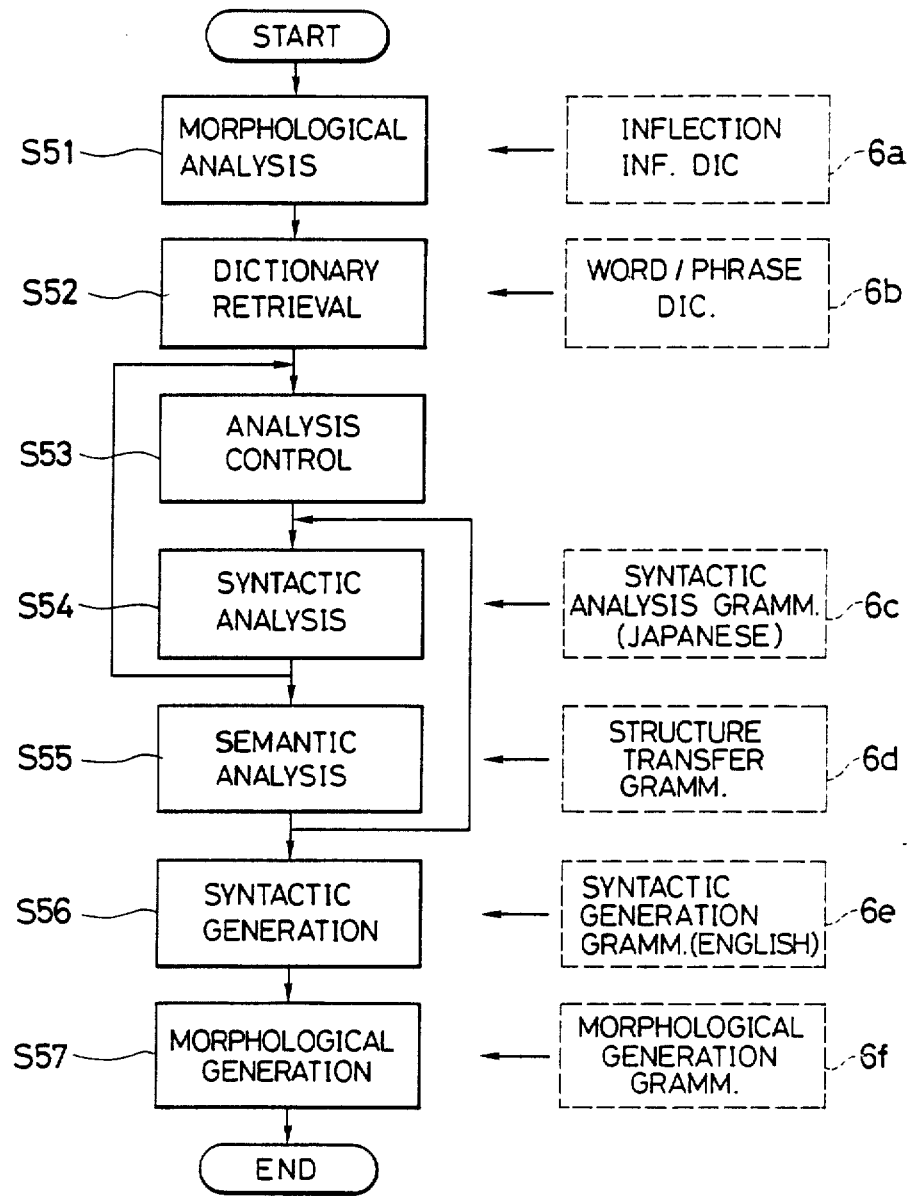
FIG. 5 is a flowchart showing the control procedure executed by a translation unit incorporated in the system shown in FIG. 1.

FIG. 7 shows a flowchart of generating a noun (morpheme) in step S57 shown in FIG. 5. Control first checks whether a translated noun is singular or plural on the basis of the feature included in the concept data corresponding to the noun in step S71. If the noun is determined as a singular noun, a basic singular form of the noun is generated in step S72. If the noun is determined as a plural noun, control checks whether the noun is regular inflection or irregular inflection on the basis of the information included in the concept data corresponding to the noun in step S73. If the noun is determined as regular inflection, a plural form of the noun is generated with reference to the inflection rule or forms included in the concept data in the step S74. For instance, in the case of "book", "books" is generated in accordance with the regular rule (+s). If the noun is determined as irregular inflection, a plural form of the noun is generated with reference to an irregular inflection table as shown in FIG. 8, in which a plural form of "child" is determined as "children" and that of "man" is determined as "men", for instance.

In the above description, a noun has been determined as plural on the basis of the semantic analysis of an adjective or an adverb phrase. In the same way, it is also possible to determine whether an adjective or an article is singular or plural (as is the case of German) on the basis of the semantic analysis of an adjective, adjective phrase, adverb, adverb phrase, etc., as long as the nature of a part of a speech is clarified as being indicative of the concept of "number".

What is claimed is:

1. A machine translation system for translating the Japanese language into another language including modifiers indicative of plural numbers of associated parts of speech, comprising:
   (a) input means for inputting an original sentence in the Japanese language containing terms having no distinctions between the singular form and the plural form;
   (b) dictionary means for storing information about the Japanese and the other language, inclusive of semantic information indicative of plural number;
   (c) translation means for syntactically and semantically translating the Japanese language into the other language having morphological distinctions between singular form and plural form on the basis of syntactic relationship between a first word category having a morphological distinction between the two forms and a second word category including semantic information indicative of plural number; and
   (d) output means for outputting the other language.

2. The machine translation system as set forth in claim 1, wherein said translation means translates the Japanese language terms having no morphological distinctions between the singular form and the plural form into the other language having a morphological distinction between the two in accordance with the following procedure:
   (a) morphologically analyzing the Japanese language into first-language basic morphemes on the basis of an inflection information dictionary;
   (b) retrieving lexical syntactic information;
   (c) syntactically analyzing the Japanese language into an intermediate structure indicative of a modification relationship between at least two words in accordance with Japanese language syntactic analysis grammar;
   (d) semantically transferring the Japanese language intermediate structure into a second language intermediate structure in accordance with structure transfer grammar, and forming concept data of a first category including any feature indicative of plural number when the first category is modified by the second category including a semantic indication of plural number;
   (e) syntactically generating a second language sentence structure from the second language intermediate structure and in accordance with second language syntactic generation grammar; and
   (f) generating morphemes in the generated second-language sentence structure in accordance with morphological generation grammar.

3. The machine translation system as set forth in claim 1, wherein the first category is a noun or a pronoun.

4. The machine translation system as set forth in claim 1, wherein the first category is an adjective.

5. The machine translation system as set forth in claim 1, wherein the first category is a definite article or an indefinite article.

6. The machine translation system as set forth in claim 1, wherein the second category is an adjective or an adjective phrase.

7. The machine translation system as set forth in claim 1, wherein the second category is an adverb or an adverb phrase.

8. A machine translation system for translating the Japanese language, containing terms having no morphological distinctions between the singular and plural forms into a second language having morphological distinctions between the singular and plural forms, including modifiers indicative of plural numbers of associated parts of speech, comprising:

(a) input means for inputting the Japanese language;
(b) dictionary means for storing information about the Japanese and the other language;
(c) translation means for translating the Japanese language into the other language on the basis of information stored in said dictionary means; and
(d) output means for outputting the other translated language, wherein said dictionary means comprises semantic information indicative of plural number; and said translation means syntactically and semantically translates the Japanese language into the second language on the basis of syntactic relationships between a first category of words having morphological distinctions between singular and plural forms and a second category of words including semantic information indicative of plural number.

* * * * *